US012231441B2

United States Patent
Smith et al.

(10) Patent No.: US 12,231,441 B2
(45) Date of Patent: Feb. 18, 2025

(54) THREAT INTELLIGENCE ON A DATA EXCHANGE LAYER

(71) Applicant: Musarubra US LLC, Plano, TX (US)

(72) Inventors: Christopher Smith, Sherwood, OR (US); Edward T. McDonald, Hillsboro, OR (US); Don R. Hanson, II, Portland, OR (US)

(73) Assignee: Musarubra US LLC, Plano, TX (US)

( * ) Notice: Subject to any disclaimer, the term of this patent is extended or adjusted under 35 U.S.C. 154(b) by 117 days.

(21) Appl. No.: 17/155,318

(22) Filed: Jan. 22, 2021

(65) Prior Publication Data

US 2021/0144157 A1    May 13, 2021

Related U.S. Application Data (63) Continuation of application No. 16/684,756, filed on Nov. 15, 2019, now Pat. No. 10,904,269, which is a continuation of application No. 14/912,743, filed as application No. PCT/US2014/058130 on Sep. 29, 2014, now Pat. No. 10,484,398.

(Continued)

(51) Int. Cl.
*H04L 9/40*        (2022.01)
(52) U.S. Cl.
CPC ........ *H04L 63/1408* (2013.01); *H04L 63/168* (2013.01)
(58) Field of Classification Search
CPC .................. H04L 63/1408; H04L 63/168
See application file for complete search history.

(56) References Cited

U.S. PATENT DOCUMENTS 5,987,610 A    11/1999    Franczek et al.
6,073,142 A    6/2000    Geiger et al.
(Continued)

FOREIGN PATENT DOCUMENTS

CN    101681400 A    3/2010
WO    2015048687 A1    4/2015

OTHER PUBLICATIONS

Banavar G, Chandra T, Mukherjee B, Nagarajarao J, Strom RE, Sturman DC. "An efficient multicast protocol for content-based publish-subscribe systems". In Proceedings. 19th IEEE International Conference on Distributed Computing Systems (Cat. No. 99CB37003) Jun. 5, 1999 (pp. 262-272). IEEE. (Year: 1999).*

(Continued)

*Primary Examiner* — Catherine Thiaw
(74) *Attorney, Agent, or Firm* — Hanley, Flight & Zimmerman, LLC (57) ABSTRACT

In an example, a threat intelligence controller is configured to operate on a data exchange layer (DXL). The threat intelligence controller acts as a DXL consumer of reputation data for a network object, which may be reported in various different types and from various different sources. Of the devices authorized to act as reputation data producers, each may have its own trust level. As the threat intelligence controller aggregates data from various providers, it may weight the reputation reports according to trust level. The threat intelligence engine thus builds a composite reputation for the object. When it receives a DXL message requesting a reputation for the object, it publishes the composite reputation on the DXL bus.

17 Claims, 5 Drawing Sheets

Related U.S. Application Data (60) Provisional application No. 61/884,100, filed on Sep. 29, 2013.

(56) References Cited

U.S. PATENT DOCUMENTS

| | | | |
|---|---|---|---|
| 6,460,050 | B1 | 10/2002 | Pace et al. |
| 7,506,155 | B1 | 3/2009 | Stewart et al. |
| 7,716,297 | B1 | 5/2010 | Wittel et al. |
| 8,336,100 | B1 | 12/2012 | Glick et al. |
| 8,510,836 | B1 | 8/2013 | Nachenberg |
| 8,868,654 | B2 * | 10/2014 | Guha .................. H04L 63/0421 709/204 |
| 9,779,392 | B1 * | 10/2017 | Prasad .................... G06Q 40/02 |
| 10,275,267 | B1 * | 4/2019 | de Kadt .............. H04L 41/0803 |
| 2002/0049785 | A1 | 4/2002 | Bauchot |
| 2002/0165815 | A1 | 11/2002 | Vincent |
| 2003/0182567 | A1 | 9/2003 | Barton et al. |
| 2006/0253581 | A1 | 11/2006 | Dixon et al. |
| 2007/0022589 | A1 | 2/2007 | Ishizuka et al. |
| 2007/0130351 | A1 | 6/2007 | Alperovitch et al. |
| 2007/0222589 | A1 | 9/2007 | Gorman |
| 2008/0005223 | A1 | 1/2008 | Flake et al. |
| 2008/0103798 | A1 * | 5/2008 | Domenikos ........ G06Q 30/0185 705/318 |
| 2008/0133300 | A1 * | 6/2008 | Jalinous .............. G06Q 10/0637 705/7.29 |
| 2008/0320552 | A1 * | 12/2008 | Kumar ................ H04L 63/1433 726/1 |
| 2010/0057835 | A1 | 3/2010 | Little |
| 2010/0169148 | A1 * | 7/2010 | Oberhofer ........ G06Q 10/06311 707/E17.017 |
| 2010/0179832 | A1 | 7/2010 | Deursen et al. |
| 2010/0192216 | A1 | 7/2010 | Komatsu |
| 2010/0324942 | A1 * | 12/2010 | Rogers .................. G06Q 40/00 709/206 |
| 2011/0004693 | A1 | 1/2011 | Rehfuss |
| 2011/0113105 | A1 | 5/2011 | Eckardt |
| 2011/0196824 | A1 | 8/2011 | Maes |
| 2011/0307474 | A1 | 12/2011 | Hom et al. |
| 2012/0030293 | A1 | 2/2012 | Bobotek |
| 2012/0072480 | A1 | 3/2012 | Hays et al. |
| 2012/0197911 | A1 | 8/2012 | Banka et al. |
| 2012/0210335 | A1 | 8/2012 | Salt et al. |
| 2013/0104236 | A1 | 4/2013 | Ray et al. |
| 2013/0254897 | A1 | 9/2013 | Reedy et al. |
| 2013/0276089 | A1 * | 10/2013 | Tseitlin ............... H04L 63/1433 707/E17.046 |
| 2014/0059683 | A1 | 2/2014 | Ashley |
| 2014/0096251 | A1 | 4/2014 | Doctor et al. |
| 2014/0109190 | A1 | 4/2014 | Cam-Winget et al. |
| 2014/0150060 | A1 | 5/2014 | Riley |
| 2014/0331119 | A1 | 11/2014 | Dixon et al. |
| 2015/0067849 | A1 | 3/2015 | Agrawal et al. |
| 2015/0207809 | A1 | 7/2015 | Macaulay |
| 2016/0197941 | A1 | 7/2016 | Smith et al. |

OTHER PUBLICATIONS

Non Final Office Action in U.S. Appl. No. 14/912,743 dated Dec. 11, 2017, 14 pages.
Non Final Office Action in U.S. Appl. No. 14/912,73 dated Dec. 13, 2018, 15 pages.
Non Final Office Action in U.S. Appl. No. 16/684,756 dated Jul. 24, 2020, 6 pages.
Notice of Allowance in U.S. Appl. No. 14/912,743 date Jul. 3, 2019, 19 pages.
Notice of Allowance in U.S. Appl. No. 16/684,756 dated Nov. 17, 2020, 8 pages.
"Survey on NoSQL Database," Han, et al IEEE, 2011, pp. 363-366.
"Enterprise Service Bus—Wikipedia", Anonymous, Sep. 28, 2013, retrieved from the Internet: https://en.wikipedia.org/w/index.php?title=Enterprise_service_bus&oldid=574913410. retrieved on Mar. 6, 2017.
Lyublena Antova, Konstantinos Krikellas, Florian M. Waas "Automatic Capture of Minimal, Portable, and Executable Bug Repros Using AMPERe", 2012, ACM , 6 pages (Year: 2012).
International Searching Authority, "International Search Report," issued in connection with International Application No. PCT/US2014/058130, mailed on Jan. 12, 2015, 4 pages.
International Searching Authority, "International Preliminary Report on Patentability," issued in connection with International Application No. PCT/US2014/058130, issued on Mar. 29, 2016, 5 pages.
European Patent Office, "Extended European Search Report," issued in connection with European Patent Application No. 14847338.2, dated Mar. 15, 2017, 7 pages.
European Patent Office, "Communication pursuant to Article 94(3) EPC," issued in connection with European Patent Application No. 14847338.2, dated Feb. 22, 2018, 4 pages.
Chinese First Office Action in Chinese Patent Application No. 201480048617.9 dated May 8, 2018, 13 pages with translation.
European Patent Office, "Communication under Rule 71(3) EPC," issued in connection with European Patent Application No. 14847338.2, dated Sep. 10, 2018, 8 pages.
European Patent Office, "Communication under Rule 71(3) EPC," issued in connection with European Patent Application No. 14847338.2, dated Jan. 17, 2019, 8 pages.
European Patent Office, "Decision to Grant a European Patent," issued in connection with European Patent Application No. 14847338.2, dated Feb. 14, 2019, 2 pages.
United States Patent and Trademark Office, "Advisory Action," issued in connection with U.S. Appl. No. 14/912,743, dated Oct. 5, 2018, 3 pages.
United States Patent and Trademark Office, "Corrected Notice of Allowability," issued in connection with U.S. Appl. No. 14/912,743, dated Sep. 6, 2019, 2 pages.

* cited by examiner

THREAT INTELLIGENCE ON A DATA EXCHANGE LAYER

CROSS-REFERENCE TO RELATED APPLICATIONS

This application claims priority to U.S. Provisional Application 61/884,100, titled "Zero-Administration NoSQL Reputation," filed Sep. 29, 2013, which is incorporated herein by reference. Co-pending PCT applications PCT/US2014/057934, filed on Sep. 28, 2014 titled "Security-Connected Framework" and PCT/US2013/076570, titled "Context-Aware Network on a Data Exchange Layer," filed Dec. 19, 2013, are also incorporated herein by reference.

FIELD OF THE DISCLOSURE

This application relates to the field of enterprise security, and more particularly to a threat intelligence service on a data exchange layer.

BACKGROUND

An enterprise service bus (ESB) is a software-based network architecture that provides a medium of data exchange over a service-oriented architecture. In some embodiments, ESB is a special case of a client-server software architecture in which clients may route messages through the server.

Software, binaries, executables, advertising, web pages, documents, macros, executable objects, and other data provided to users (collectively "executable objects") may include security flaws and privacy leaks that are subject to exploitation by malware. As used throughout this Specification, malicious software ("malware") may include a virus, Trojan, zombie, rootkit, backdoor, worm, spyware, adware, ransomware, dialer, payload, malicious browser helper object, cookie, logger, or similar application or part of an application designed to take a potentially-unwanted action, including by way of non-limiting example, data destruction, covert data collection, covert communication, browser hijacking, network proxy hijacking or redirection, covert tracking, data logging, keylogging, excessive or deliberate barriers to removal, contact harvesting, unwanted use of premium services, and unauthorized self-propagation. In some cases, malware may also include legitimate software that includes inadvertent security flaws that cause or enable malware behavior. "Malware behavior" is defined as any behavior that qualifies an application as malware or grayware. Some existing systems are configured to identify and block malware, for example by maintaining databases of known malware.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

In an example, a threat intelligence controller is configured to operate on a data exchange layer (DXL). The threat intelligence controller acts as a DXL consumer of reputation data for a network object, which may be reported in various different types and from various different sources. Of the devices authorized to act as reputation data producers, each may have its own trust level. As the threat intelligence controller aggregates data from various providers, it may weight the reputation reports according to trust level. The threat intelligence engine thus builds a composite reputation for the object. When it receives a DXL message requesting a reputation for the object, it publishes the composite reputation on the DXL bus.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

In addition to executable objects, a network may encounter many other objects, including by way of non-limiting example files, certificates, internet protocol (IP) address, domain names, users, entities, enterprises, and applications, all of which may be referred to collectively as "network objects." A substantial concern for an enterprise is assigning objects reputations, which may affect the object's ability to function on the network, access network resources, or interact with other network objects.

In an example, multiple network elements are connected to one another via a data exchange layer (DXL), which is a type of ESB that is suitable for exchange of security-related messages among other things. As used herein, "network elements" include any type of client or server (e.g., a video server, a web server, etc.), routers, switches, gateways, bridges, load-balancers, firewalls, inline service nodes, proxies, network appliances, processors, modules, or any other suitable device, component, element, or object operable to exchange information in a network environment. More specifically, DXL endpoints are network elements that interact over a DXL ESB. DXL endpoints may be distributed across a customer network and communicate in "real-time" in a trusted, secure, and reliable fashion. This may provide increased automation and improved security services.

In an example, DXL endpoints are deployed at strategic locations within a network to intercept ongoing business activity, inspect and interpret it, and ultimately determine whether it is authorized; meaning for example that it is consistent with enterprise security policies. In some cases, network elements must make such decisions "in-band," momentarily suspending the business activity, and in "machine-real-time," at latencies low enough to avoid a significant user-perceptible delay in the business activity.

In some cases, network elements may have independent access to security data only by way of their own independent analysis and observation, and via scheduled definition updates, which may come, for example, on a weekly basis as updated malware definition.

Because network elements are often heterogeneous and may be deployed, particularly in a modern network, in a temporary or ad hoc fashion, real-time intelligence becomes a challenge, particularly when "in-band" decisions are necessary. Furthermore, an enterprise may procure security solutions in a piecemeal fashion, so that one product cannot always assume the presence of another product. For example, there may not be a single, pre-defined repository of threat intelligence for network elements to consult, and regular malware definition updates may not include lately discovered threats. Representation and interpretation of data offer yet another challenge. Network elements may use disparate, proprietary data representations. Thus, for example, even an antivirus scanner may not be configured to share newly discovered malware information with a network-based security device. Trustworthiness of information may be yet another challenge in other contexts. In other words, even if an antivirus scanner and network-based security device are configured to share security intelligence, each may not have a means of validating intelligence received from the other.

In an example, the present Specification provides a data exchange layer (DXL), which may operate on a lightweight messaging-based communications infrastructure such as ESB and be configured to allow endpoints to share contextual data. DXL may be one element of a larger security-connected framework, which is an adaptive system, such as a security system, of interconnected services that communicate and share information to make real-time, accurate security decisions by individual security products and/or as a collective. According to an example, network, endpoint, database, application and other security solutions need not operate as separate 'silos' but as one synchronized, real-time, context-aware and adaptive security system.

The DXL is built on top of messaging technology, such as an ESB, which enables multiple different use cases and capabilities (context-aware and adaptive security by sharing context between multiple different products allowing for security components to operate as one to immediately share relevant data between endpoint, gateway, and other security products enabling security intelligence and adaptive security (immediately change behavior according to information you are getting); superior command and control of endpoints and many other use cases).

These advantageous abilities are enabled by the use of ESB messaging for security and management purposes. DXL messaging enable real-time, bi-directional communications infrastructure allowing products and solutions to integrate with each other using a single application programming interface (API). Each device may share essentially any data it likes over the DXL fabric, while the devices themselves are only loosely coupled, and need not operate on common or standardized protocols.

Examples of DXL message types include publish-subscribe notifications, query-response, and push notification. Devices may also share events, including security-related events, contextual information (about the node, the identity of its user, the applications used, the location for which they are found, etc.), commands, tasks, and policies, by way of non-limiting example.

In a first example of a security-connected framework, messaging technologies are used to maintain and enhance enterprise security. Security information shared over the security-connected framework may comprise more than just context, and may also comprise commands, tasks, policies and software updates by way of non-limiting example. Thus, with a security-connected framework, the infrastructure is able to function as a command and control management infrastructure. The infrastructure may also be used with security management software (SMS), such as McAfee® ePolicyOrchestrator. The SMS may connect to the DXL ESB, enabling the SMS to provide command and control functions across an entire network.

Messaging enables integration between products in a loosely coupled manner lowering the amount of assumptions two, or more, products makes about each other in order to integrate. The present implementation uses a single API embedded with the McAfee Agent and provided as a software library.

The security-connected framework of the present Specification also addresses issues of control over the status of operational security. Certain existing security management solutions are unable to initiate communications at-will with managed devices that sit, for example, on the other side of a network address translation (NAT) boundary. The challenge may become more complicated with changing business needs such as cloud, mobilization, and consumerization by way of non-limiting example.

In these cases, managed devices may initiate communication at unpredictable times, leaving open a window during which the enterprise is exposed to increased risk from its inability to immediately push policy changes, content deployments, and program updates to all nodes.

In one example of this challenge, orchestration of security defenses is needed as an immediate reaction to a security event. As used throughout this Specification, a "security event" includes any event on a device or a network that has substantial ramifications for personal and/or enterprise security. Non-limiting examples of security events include actual or potential intrusion events, user or device authentication events, audit events, malware incidents, anti-malware updates, user or device reputation updates, physical intrusion events, data loss, import of substantial or significant data, or changes in enterprise security policies.

In a second example of a security-connected framework, a real-time, bi-directional communications fabric is provided for enabling real-time security management. Specifically, certain existing messaging infrastructures are based on one-to-many communications (publish-subscribe). In this example of the present Specification, the publish-subscribe capabilities are significantly enhanced, so that communication can be one-to-one (for example, peer-to-peer), or bi-directional (for example, query-response). Advantageously, the framework can scale to millions of concurrent connected clients, so that any connected client can reach any other connected client in real-time or near real-time regardless of the physical location of the connected clients. To this end, the DXL abstraction layer is provided between different types of connected clients, and acts as an intermediary communications medium.

In this example, client devices may variously be classified as either "producers" or "consumers" of messages, wherein producers provide relevant security messages, and consumers receive those messages. A device's role as either a producer or consumer need not be static, and in general any device can be either a producer or a consumer, depending on context. A device's role as producer or consumer may also change over time or circumstances. Thus, one device may be both a producer and consumer of certain message topics; a second device may be a producer for some topics but not for other topics; a third device may be a consumer for certain topics and a producer for other topics.

As long as clients are subscribed to one or more topics (wherein each topic includes a different class or species of message) a communication path exists to the consumers. Connection initiation is performed by clients.

As used throughout this Specification, a "DXL message" includes any message communicated over a DXL ESB. Each DXL message includes at least one "topic"; a topic, representing a subject of the message. Topics may include, threat intelligence, context, and events by way of non-limiting example.

By design, each DXL endpoint is configured to subscribe to at least one DXL message topic (at a minimum, a private destination topic for routing DXL messages to that DXL endpoint). This enables bi-directional communications, over the DXL, between a management platform, for example, and one or more of its managed clients.

Figure 1:
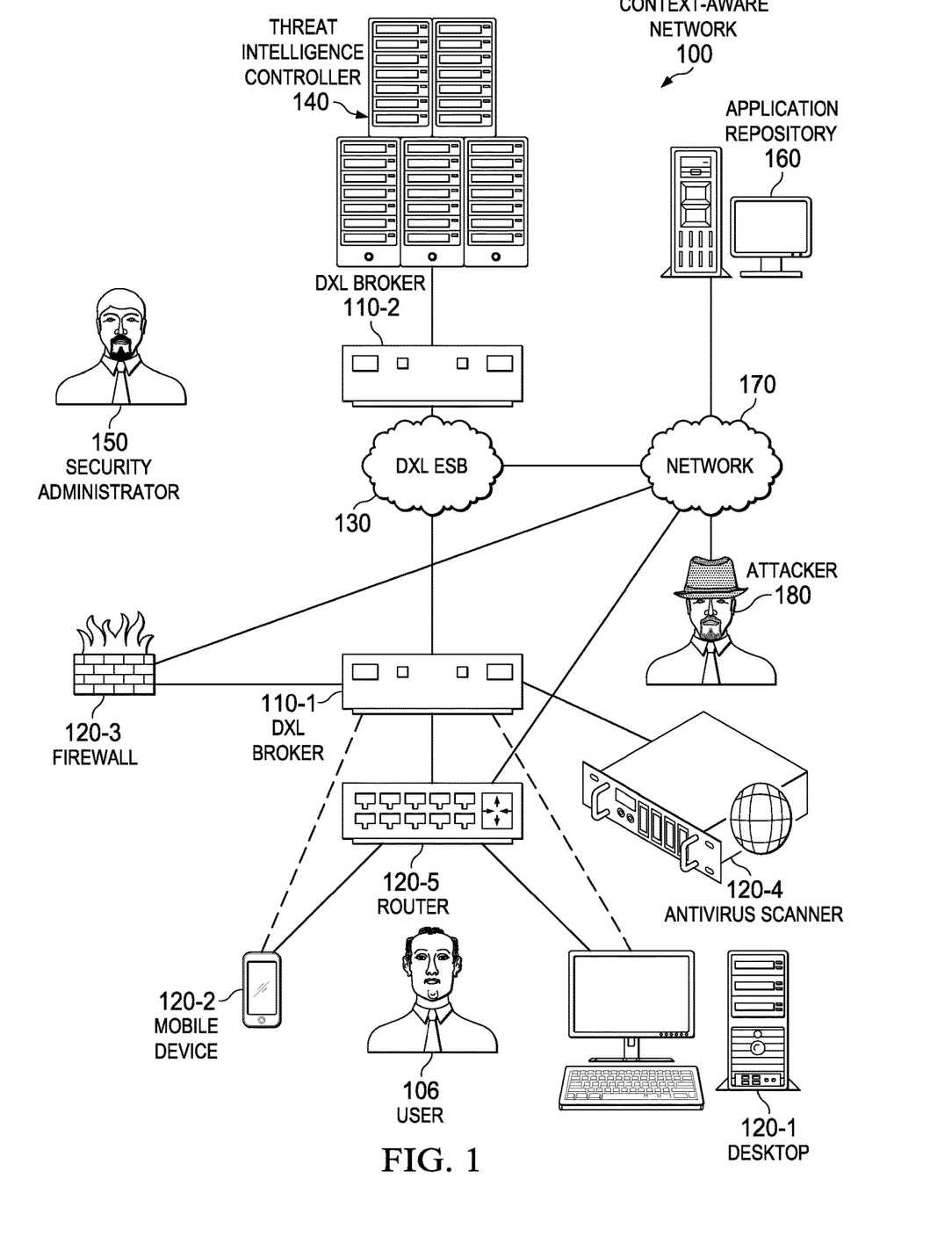
FIG. 1 is a block diagram of context-aware network according to one or more examples of the present Specification.
Figure 2:
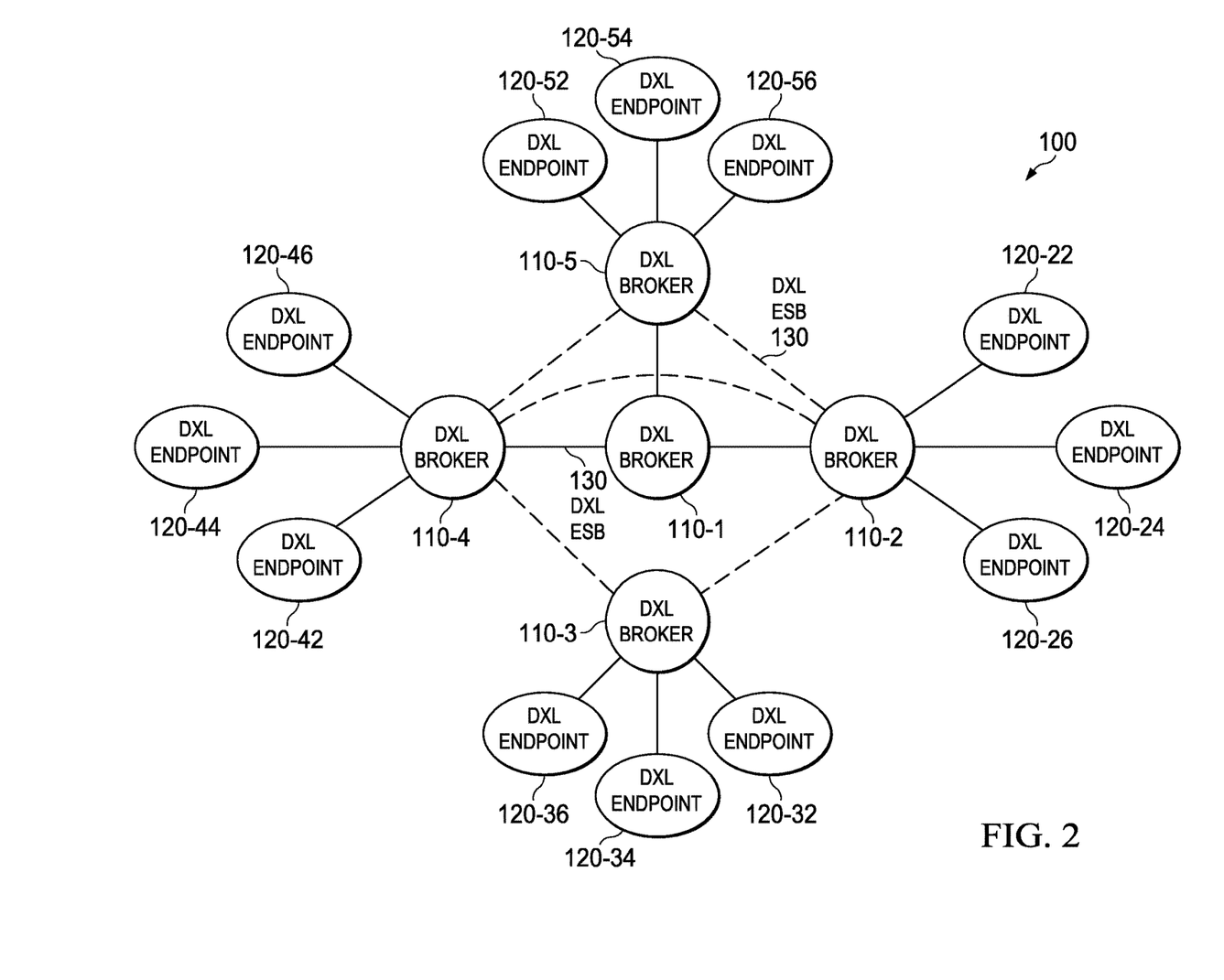
FIG. 2 is a block diagram of a data exchange layer according to one or more examples of the present Specification.

FIG. 1 is a network-level block diagram of a context-aware network 100 with DXL capability. According to this example, a plurality of DXL endpoints 120 are connected to a DXL enterprise service bus (ESB) 130 (FIG. 2). DXL ESB 130 is an example of a DXL fabric, and may be provided on top of an existing network, such as a local area network (LAN). DXL ESB 130 need not be a particular physical bus, or even reside on a physical network. Rather, DXL ESB 130 may span multiple physical network and subnetworks. Conceptually, DXL ESB 130 is simply the "fabric" over which DXL endpoints 120 share DXL messages, wherein each DXL message includes a topic, and only DXL endpoints 120 that subscribe to that topic receive and/or act on messages for that topic. Advantageously, DXL ESB can extend even to non-trusted or unsecured networks so long as the DXL endpoints 120 themselves are trusted and can be sufficiently authenticated. Thus, for example, a remote user operating a DXL endpoint 120 at a coffee shop may still be able to send and receive DXL messages via his enterprise's DXL ESB 130, so long as the DXL endpoint 120 can be authenticated. In some cases, a DXL endpoint's network location may affect whether the DXL endpoint 120 is more trusted or less trusted for certain message topics.

DXL endpoint 120 may be any suitable computing device. In the example of FIG. 1, DXL endpoints are generically represented as computing devices. DXL ESB 130 maybe any type of physical or virtual network connection over which appropriate data may pass. At present, there is no fixed or global standard for an ESB, and the term, as used herein, is intended broadly to encompass any network technology or topology suitable for message exchange. In one embodiment, message queuing telemetry transport (MQTT) messages are exchanged on port 8883. In this example, threat intelligence controller 140 may be considered a special cases of a DXL endpoint 120. Other network elements may include a default gateway, proxy, and threat intelligence service. Any network element may join DXL ESB 130 as a DXL endpoint.

Network elements configured to operate on or with DXL ESB 130 may be referred to as "DXL endpoints." These may include, in an example, DXL endpoints 120 and threat intelligence controller 180.

DXL broker 110 may be configured to provide DXL messaging services over DXL ESB 130, such as maintaining DXL routing tables and delivering messages.

In the example of FIG. 1, DXL ESB 130 is provided by an enterprise. In this case, two DXL brokers 110 connect to various DXL endpoints 120. For example, DXL broker 110-1 is directly connected to a firewall appliance 120-3, an antivirus scanner 120-4, and a router 120-5. To client machines, desktop computer 120-1 and mobile device 120-2 are connected to router 120-5. In this case, although desktop computer 120-1 and mobile device 120-2 are a hop removed from DXL broker 110-1 in the physical network layer, for DXL purposes, they can be considered to be connected to DXL broker 110-1.

A threat intelligence controller 140 is connected to DXL broker 110-2. As described in more detail below, threat intelligence controller 140 may be a special case of a DXL endpoint 120, and may be specifically configured to provide threat intelligence services. A security administrator 150 may administer threat intelligence controller 140, for example by configuring threat intelligence controller 140, applying policies thereto, and otherwise maintaining threat intelligence controller 140. Security administrator 150 may be an individual working for the same enterprise that operates DXL ESB 130, or in another embodiment, security administrator 150 may be a separate enterprise that provides a global threat intelligence controller 140. In that case, DXL broker 110-2 may connect via a remote connection. In this example, threat intelligence controller 140 is not connected to enterprise network 170 separate from DXL ESB 130. This represents the fact that in some cases, threat intelligence controller 140 may be a dedicated DXL endpoint, and may not serve a network function outside of the DXL architecture.

Other devices may have separate network functions on network 170. Network 170 may be an enterprise network, or may be a distributed or local network. In one case, network 170 is the Internet. DXL ESB 130 may be communicatively coupled to network 170. In addition to the enterprise network, access to an application repository 160 may be provided via network 170, and an attacker 180 may try to attack the enterprise via network 170.

Firewall appliance 120-3 may be configured to provide firewall services to incoming traffic on network 170. Thus firewall 120-3 is directly communicatively coupled to network 170. In some cases, firewall appliance 120-3 is a physical appliance that physically sits in a network stream before any other connected devices. In another example, firewall clients 120-3 is a virtual machine provided on a hypervisor, which is configured to inspect incoming traffic before routing it to other network devices. It should be recognized that many other configurations are possible.

Antivirus scanner 120-4 may be configured to also inspect incoming network traffic, and to monitor network 174 suspicious or known malware activity.

Attacker 180 may try to attack network 170, for example by injecting malware into network 170. Attacker 180 may have as a purpose breaching the security of desktop computer 120-1 or mobile device 120-2. Attacker 180 may also be trying to breach a network server, which in various embodiments may also be a DXL endpoint. The purpose of firewall 120-3 and antivirus scanner 120-4 includes preventing attacker 180 from breaching the security of network 170. Threat intelligence controller 140 can assist in performing this function by collecting and aggregating instantaneous reputation data from devices such as firewall 120-3 and antivirus scanner 120-4, and reporting object reputations over DXL ESB 130.

In one example, antivirus scanner 120-4 and firewall 120-3 may both encounter an object injected into network 170 by attacker 180. The object may be new to network 170, and may not yet have a firmly established network reputation. Thus antivirus scanner 120-4 and firewall 120-3 may inspect the object, and in one example may find the object slightly suspicious, but not so suspicious us to completely block it. Thus antivirus scanner 120-4 and firewall 120-3 permit the object to propagate across network 170. Standing alone, any analytical work done by firewall 120-3 or antivirus scanner 120-4 may then be lost. However, if firewall 120-3 and antivirus scanner 120-4 report their decisions to threat intelligence controller 140, for example by publishing a DXL message to a topic such as OBJECT_REPUTATION, threat intelligence controller 140 may compel a composite score for the object. For example, if antivirus scanner 120-4 and firewall 120-3 both inspect the object and in both cases the object barely passes for propagation onto network, threat intelligence controller 140 has higher level of visibility that allows it to see that in both cases the object was deemed suspicious and was barely allowed to propagate on the network. Based on such inputs, threat intelligence controller 140 may craft a composite reputation for the object, and determine that the object has enough suspicious marks against it that it should be blocked on the network. In one case, threat intelligence controller 140 simply blocks the object. In another case, threat intelligence controller 140 may mark the object for deeper inspection by an antivirus or anti-malware research team. In another example, threat intelligence controller 140 may mark the object for sandboxing or other computer analysis before allowing it to propagate on the network.

In some cases, a DXL endpoint 120 that is authorized to be a reputation data provider may encounter an object and may immediately determine that the object is harmful or dangerous to network 170. In that case, the object may publish a DXL message indicating that the object has been deemed malware. This message may go out to any DXL endpoint 120 that is subscribed to that message topic. Threat intelligence controller 140 will be one of the DXL endpoints that subscribes to the message topic. Thus, threat intelligence controller 140 may recognize the threat based on the report, and may immediately propagate instructions for other DXL endpoints 120 to harden themselves against the object as appropriate.

Also in FIG. 1, an application repository 160 may be operated by an entity other than the enterprise operating DXL ESB 130. In that case, application repository may include a large number of applications, only some of which are suitable for execution on enterprise devices such as desktop computer 120-1 and mobile device 120-2. For example, application repository 160 may include a large collection of business applications and utilities, but may also include games and other time wasters. Security administrator 150 may propagate an enterprise policy that prohibited games another time wasters from executing on enterprise devices. Thus, while objects coming from application repository 160 may not necessarily be malware, they may, in some cases, be contrary to enterprise policy. In that case, antivirus scanner 120-4 may be further configured to analyze attempts to download applications from application repository 160, and may act appropriately, such as either permitting the download or blocking it. Again, this decision may be reported to threat intelligence controller 140. In another example, an application available via application repository 160 may belong to a class of applications that have been deemed to be against enterprise policy, but an end-user 106 may have a legitimate need for executing the application on a desktop computer 120-1. Thus, user 106 may request special permission from security administrator 150 to download the application from application repository 160. In that case, security administrator 150 may propagate a manual override over DXL ESB 130, permitting the user access to download and run the application from application repository 160. Again, threat intelligence controller 140 may cash this decision, and over time it may watch a trend of such decisions. In one example, a large number of decisions to grant access to a particular application may cause threat intelligence controller 140 to propagate DXL message deeming the application to be safe, or safe in certain circumstances. In another case, threat intelligence controller 140 may make an automated recommendation to security administrator 150 that a permanent exception be granted. In yet another example, threat intelligence controller 140 may determine that a large number of applications from a restricted class in application repository 160 have been allowed by security administrator 150. In that case again, threat intelligence controller 140 may determine that the application class has likely been mislabeled as blocked. Again, threat intelligence controller 140 may publish a message directing DXL endpoints to allow installation of software from that class, or may provide a recommendation to security administrator 150.

FIG. 2 is a network diagram disclosing a DXL ESB 130 on a context aware network 100 according to one or more examples of the present Specification. In this example, DXL broker 110-1 may be designated as the "hub," while DXL broker 110-2, 110-3, 110-4, and 110-5 may be designated as "spokes." in an example, all DXL traffic that passes through spoke will be forwarded to the hub, which will distribute the traffic to other spokes. Designation of a DXL broker 110 as the hub may be accomplished via any suitable means, such as selecting the hub based on MAC ID, IP address, or network proximity to a domain master.

If DXL broker 110-1 goes offline, another hub may be at least temporarily needed. In that case, another have may be elected. When DXL broker 110-1 comes back online, it may resume its duties as a hub, or may act as a spoke, depending on network topology and design considerations.

In another example, spokes may form a temporary mesh network. In yet other embodiments, DXL brokers 110 may be configured to operate full time in a mesh configuration.

Additional extensibility may be provided by bridging DXL ESB 130 across disparate networks, enabling data to be exchanged over larger networks, including the Internet.

DXL brokers 110 may be configured to enhance the efficiency of DXL ESB 130. For example, each DXL broker 110 may maintain a list of subscribed topics for each connected DXL endpoint 120. The DXL broker 110 then itself subscribes to those topics. Each DXL broker 110 also maintains a list of which topics each other DXL broker 110 subscribes to. When a DXL broker 110 receives a message from any of its DXL endpoints 120, the DXL broker 110 determines which other brokers are subscribed to the topic of the DXL message, and forwards the message only to those brokers.

For example, DXL endpoint 120-42 may be an antivirus definition update server. DXL endpoints 120-52, 120-54, 120-56, 120-34, 120-36, and 120-22 may be clients that have installed on them an antivirus engine that requires antivirus updates from antivirus definition update server 120-42. Thus, clients 120-52, 120-36, and 120-22 subscribe to a topic ANTIVIRUS_DEFN_UPDATES by notifying their respective DXL brokers 110 that they wish to subscribe to that topic. DXL brokers 110-5, 110-3, and 110-2 in their turn subscribe to the topic ANTIVIRUS_DEFN_UPDATES by publishing to the other DXL brokers 110 that they are now subscribed to that topic. When antivirus definitions update server 120-42 has new updates available, it may publish a message to the ANTIVIRUS_DEFN_UPDATES topic, indicating that new antivirus updates are available. The message may also include other information, such as instructions for downloading the updates, or an expiration date indicating that after a certain time, the message should be ignored as expired.

DXL broker 110-4 receives the message from antivirus definitions update server 120-42 and looks up in its own DXL routing table that DXL brokers 110 are subscribed to the topic ANTIVIRUS_DEFN_UPDATES. DXL brokers 110-2, 110-3, and 110-5 are subscribed to this topic, so DXL broker 110-4 sends a copy of the message to each of those brokers. It does not send a copy to DXL broker 110-1, which is not subscribed to the topic.

Next, DXL brokers 110-2, 110-3, and 110-5 each distribute the message to their respective DXL endpoints that have subscribed to the topic. Advantageously, network bandwidth is saved. For antivirus definitions update server 120-42 to notify each client individually, it would have had to send out six individual copies of the message (one to each subscribed client). But in this case, only three copies are sent over the DXL ESB 130 fabric, and the DXL brokers 110 then distribute the copies locally as necessary. This reduces overall bandwidth requirement for DXL ESB 130.

Figure 3:
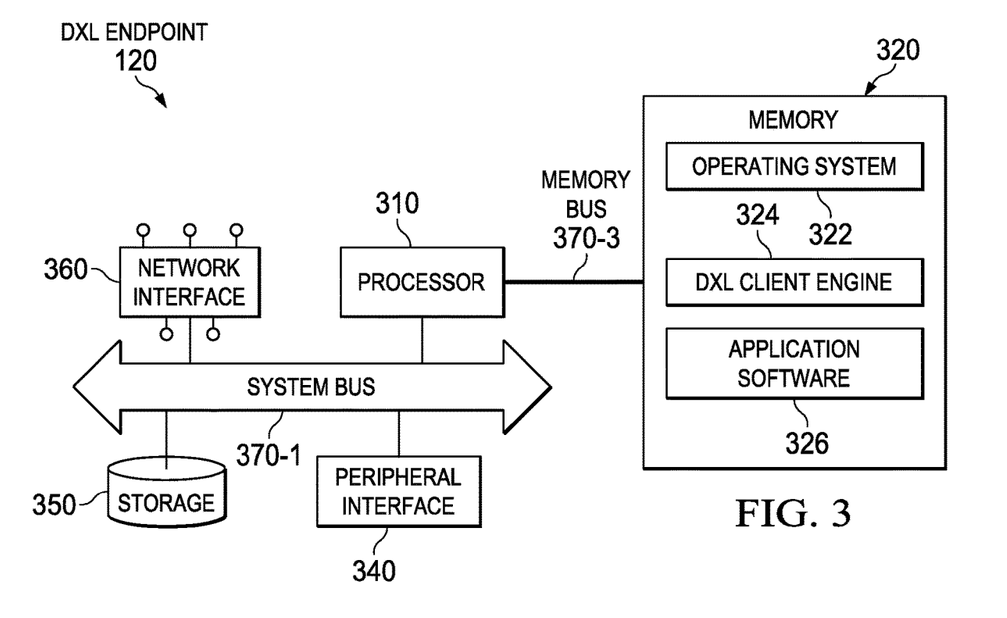
FIG. 3 is a block diagram of a DXL endpoint according to one or more examples of the present Specification.

FIG. 3 is a block diagram of DXL endpoint 120 according to one or more examples of the present Specification. DXL endpoint 120 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, server, firewall, antivirus or antimalware appliance, router, switch, or any other electronic, microelectronic, or microelectromechanical device for processing and communicating data DXL endpoint 120 includes a processor 310 connected to a memory 320, having stored therein executable instructions for providing an operating system 322 and DXL client 324. Other components of DXL endpoint 120 include a storage 350, network interface 360, and peripheral interface 340.

In an example, processor 310 is communicatively coupled to memory 320 via memory bus 370-3, which may be for example a direct memory access (DMA) bus by way of example, though other memory architectures are possible, including ones in which memory 320 communicates with processor 310 via system bus 370-1 or some other bus. Processor 310 may be communicatively coupled to other devices via a system bus 370-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 320 may comprise a relatively low-latency volatile main memory, while storage 350 may comprise a relatively higher-latency non-volatile memory. However, memory 320 and storage 350 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 350 may be any species of memory 320, or may be a separate device, such as a hard drive, solid-state drive, external storage, redundant array of independent disks (RAID), network-attached storage, optical storage, tape drive, backup system, cloud storage, or any combination of the foregoing. Storage 350 may be, or may include therein, a database or databases or data stored in other configurations, and may include a stored copy of operational software such as operating system 322 and software portions of DXL client 324. Many other configurations are also possible, and are intended to be encompassed within the broad scope of this Specification.

Network interface 360 may be provided to communicatively couple DXL endpoint 120 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Network interface 360 may be configured to communicatively couple DXL endpoint 120 to a DXL broker 110.

A DXL client engine 324 may be provided, which may provide the necessary APIs and services for connecting to DXL ESB 130.

In some cases, application software 326 may also be provided, which may similarly be any suitable combination of hardware, software and/or firmware across one or more devices. Application software 326 may also be provided to allow DXL endpoint 120 to perform its intended function, whether as a client device, a server device, a security appliance, a network appliance, or any other function.

DXL client engine 324 and application software 326 are examples of "engines." As used throughout this Specification, an "engine" includes one or more logic elements, including hardware software, and/or firmware, configured to perform or operable for performing the function of the engine. An engine may be self-contained on a single device, or may span multiple devices. Furthermore, a single device may include a plurality of engines. For ease of discussion, the engines disclosed herein are shown, by way of example only, as a software subroutine running from memory. In one example, an engine is a utility or program that provides its host device with the necessary APIs and interfaces for performing a particular function. An engine may be, in other examples, embodied in hardware, software, firmware, or some combination thereof. For example, in some cases, an engine may include a special integrated circuit designed to carry out a method or a part thereof, and may also include software instructions operable to instruct a processor to perform the method. In some cases, the engine may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In other examples, an engine may include other hardware and software, including interactive or user-mode software, which may be provided in conjunction with, in addition to, or instead of the engine to perform methods according to this Specification.

In one example, an engine comprises executable instructions stored on a non-transitory computer-readable medium operable, when executed, for performing the methods of the engine. At an appropriate time, such as upon booting the host device, or upon a command from an operating system or a user, the processor may retrieve from storage a copy of the engine load it into memory. The processor may then iteratively execute the instructions of the engine.

Peripheral interface 340 may be configured to interface with any auxiliary device that connects to DXL endpoint 120 but that is not necessarily a part of the core architecture of DXL endpoint 120. A peripheral may be operable to provide extended functionality to DXL endpoint 120, and may or may not be wholly dependent on DXL endpoint 120. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 4:
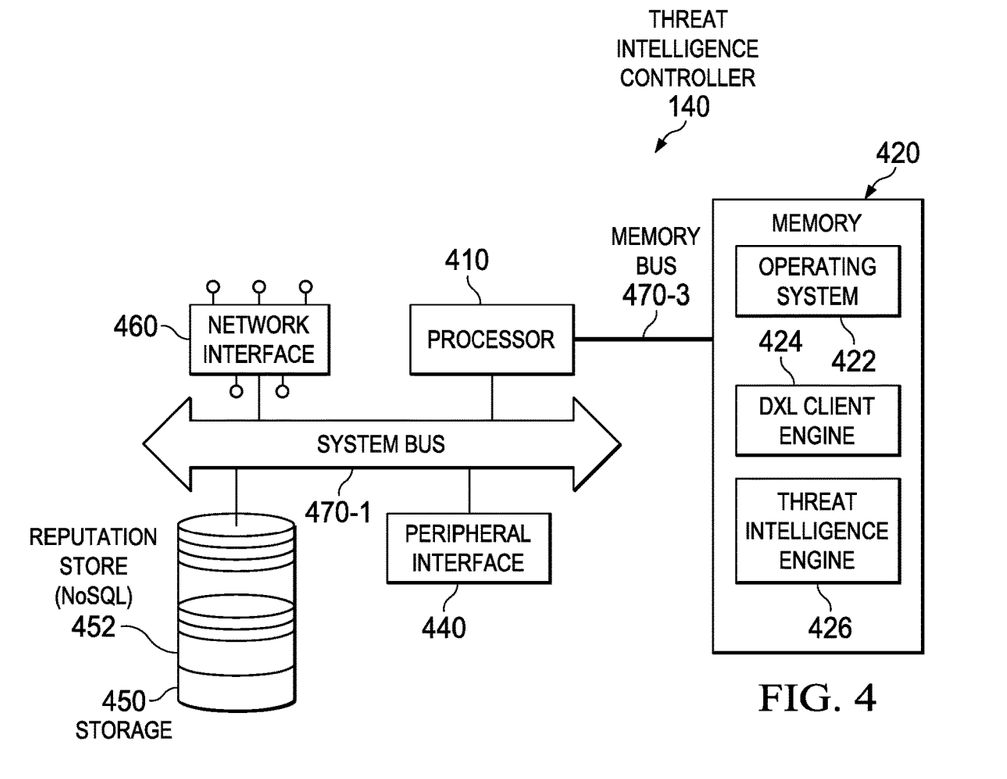
FIG. 4 is a block diagram of a threat intelligence controller according to one or more examples of the present Specification.

FIG. 4 is a block diagram of a threat intelligence controller 140 according to one or more examples of the present Specification. Threat intelligence controller 140 may be any suitable computing device, as described in connection with FIG. 3. In general, the definitions and examples of FIG. 3 may be considered as equally applicable to FIG. 4, unless specifically stated otherwise. However, a threat intelligence controller 140 is treated separately, as it is in one example a special case of a DXL endpoint configured specifically to provide threat intelligence services over DXL ESB 130.

Threat intelligence controller 140 includes a processor 410 connected to a memory 420, having stored therein executable instructions for providing an operating system 422, DXL client engine 424, and threat intelligence engine 426. Other components of threat intelligence controller 140 include a storage 450, network interface 460, and peripheral interface 440.

In an example, processor 410 is communicatively coupled to memory 420 via memory bus 470-3, which may be for example a direct memory access (DMA) bus. Processor 410 may be communicatively coupled to other devices via a system bus 470-1.

Processor 410 may be connected to memory 420 in a DMA configuration via DMA bus 470-3. To simplify this disclosure, memory 420 is disclosed as a single logical block, but in a physical embodiment may include one or more blocks of any suitable volatile or non-volatile memory technology or technologies, as described in connection with memory 320 of FIG. 3. In certain embodiments, memory 420 may comprise a relatively low-latency volatile main memory, while storage 450 may comprise a relatively higher-latency non-volatile memory. However, memory 420 and storage 450 need not be physically separate devices, as further described in connection with FIG. 3

Storage 450 may be any species of memory 420, or may be a separate device, as described in connection with storage 350 of FIG. 3. Storage 450 may be, or may include therein, a database or databases or data stored in other configurations, and may include a stored copy of operational software such as operating system 422 and software portions of DXL broker engine 424. Many other configurations are also possible, and are intended to be encompassed within the broad scope of this Specification.

In an example, storage 450 includes a reputation store 452. Reputation store may be maintained as a master database of reputations for all objects controlled by threat intelligence controller 140. In one example, reputation store 452 maintains reputation data in a "NoSQL" (non-relational) database. Because NoSQL databases are more loosely structured than relational database management systems (RDBMSs), they are particularly suited to the loosely-coupled nature of DXL messaging and reputation management. Also advantageously, NoSQL databases may be more easily replicated across an enterprise. For example, in certain embodiments, a plurality of threat intelligence controllers 140 is deployed in an enterprise. Each threat intelligence controller 140 must maintain an accurate and up-to-date copy of reputation store 452 in real-time or near-real-time. A NoSQL database is particularly suited to the type of zero-configuration self replication that is most useful in the DXL security context. Building and populating a NoSQL reputation store 452 is also a task that lends itself to automation by threat intelligence controller 140. This enables enterprises using one or more threat intelligence controllers 140 to deploy them without needing to employ a full-time database administrator.

Network interface 460 may be provided to communicatively couple Threat intelligence controller 140 to a wired or wireless network. In one example, network interface 460 provides a plurality of logical interfaces, which may include a plurality of logical interfaces on a single physical network interface, or a plurality of logical interfaces on a plurality of physical network interfaces, a single logical network interface on a plurality of physical network interfaces, or any combination thereof. In one example, a first logical network interface is configured to communicatively couple Threat intelligence controller 140 to DXL ESB 130, including to other DXL brokers 110 on DXL ESB 130. A second logical interface may be configured to communicatively couple Threat intelligence controller 140 to a plurality of DXL endpoint devices such as DXL clients 110.

Memory 420 may include, all or part of DXL client engine 424 threat intelligence service engine 426. Each may be an engine, as described in connection with FIG. 3.

Domain security engine 424 may be operable for providing the security methods described in this Specification. In one example, domain security engine 424 is operable to subscribe to a security DXL topic, and to receive security-related DXL messages. Domain security engine 424 may act on those messages according to methods described herein. Domain security engine may also be configured to act as a security information and event manager (SIEM) apparatus. In the SIEM role, domain security engine may provide services such as comparing data collected by a variety of security devices, applications and data sources, including one or more DXL endpoints 120. A SIEM may pool routers, switches, and virtual machines (VMs) and then normalize the data. Data may thus be standardized and synthesized. A SIEM may also categorize data, detecting for example a "login" event regardless of the host operating system.

Domain security engine 424 may also be configured to detect and act on or mitigate security events. A "security event" includes any event on a network that indicates a breach or intended breach of a security policy, represents a security threat, provides a security aperture, or indicates a change in security policy.

DXL services engine 426 may be provide the necessary APIs and services to enable a threat intelligence controller 140 to act as a DXL endpoint, including in particular to act as a provider or relevant DXL message topics.

Peripheral interface 440 may be configured to interface with any auxiliary device that connects to Threat intelligence controller 140 but that is not necessarily a part of the core architecture of Threat intelligence controller 140. A peripheral may be operable to provide extended functionality to Threat intelligence controller 140, and may or may not be wholly dependent on Threat intelligence controller 140. In some cases, a peripheral may be a computing device in its own right. Peripherals may include, by way of non-limiting examples, any of the devices discussed in connection with peripheral interface 340 of FIG. 3.

Figure 5:
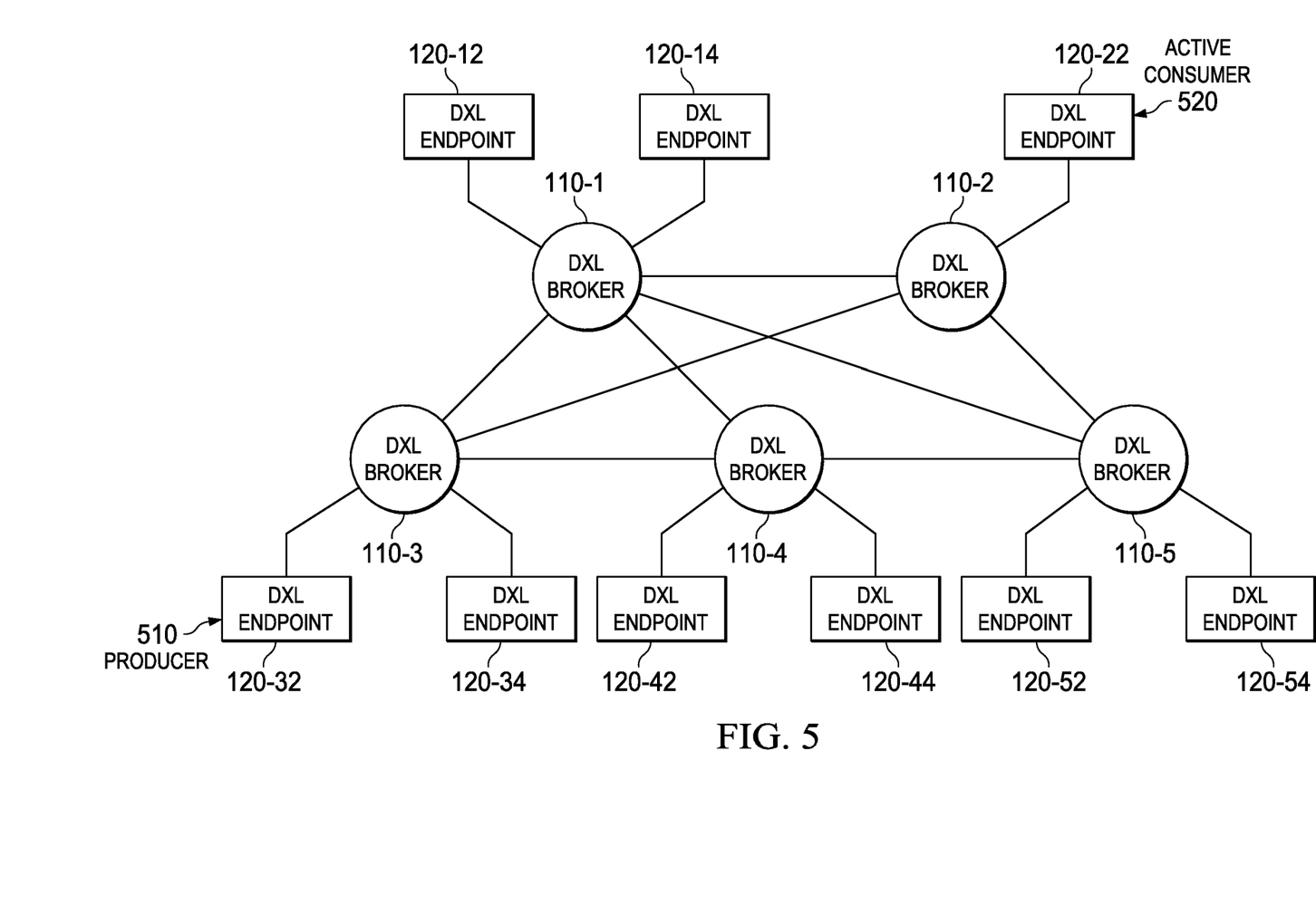
FIG. 5 is a block diagram of a provider-consumer architecture on a DXL according to one or more examples of the present Specification.

FIG. 5 is a network-level block diagram of a data exchange layer according to one or more examples of the present Specification. In the example of FIG. 5, five DXL brokers 110 provide services to DXL endpoints 120.

Specifically, DXL endpoints 120-12 and 120-14 are connected to DXL broker 110-1. DXL endpoints 120-32 and 120-34 are connected to DXL broker 110-3. DXL endpoints 120-42 and 120-44 are connected to DXL broker 110-4. DXL endpoints 120-52 and 120-54 are connected to DXL broker 110-5. DXL endpoint 120-22 is connected to DXL broker 110-2.

The configuration of FIG. 5 is particularly adapted to a consumer/producer model of a data exchange layer. In this model, certain devices are designated as producers of content, while other devices are designated as consumers of that content. For example, in one case DXL endpoint 120-32 may be designated as producer 510. DXL endpoint 120-22 may be designated as active consumer 520.

In this example, producer 510 may be a security appliance or other network device that is trusted to produce a certain type of data. This may include, for example, assigning a reputation to a network object on DXL ESB 130. When producer 510 encounters the object, it may store the reputation of the object in an internal database.

Later, when active consumer 520 encounters the object, it may desire to know the reputation of the object. Thus, active consumer 520 may publish a DXL message such as OBJECT_REPUTATION_QUERY on DXL ESB server 130.

Producer 510 may subscribe to this message, and upon receiving the message, look up the reputation of the object in its internal database. Producer 510 then publishes a message REPUTATION_QUERY_RESPONSE on DXL ESB 130. Active consumer 520 consumes this message, and may react to the network object appropriately according to the content of the message.

In one example, an important property of producer 510 is that it is trusted. This may mean, for example, that producer 510 has been verified to a certain confidence level. Because producer 510 is verified, it can be trusted to produce reliable data for consumption by other DXL endpoints. Thus, while some instances of DXL ESB 130 may permit any endpoint to act as either a producer or consumer of certain types of messages, in other embodiments, only certain endpoints may act as producers of certain kinds of messages. In those embodiments, designation of certain endpoints as consumers 520 may be more permissive.

The producer-consumer framework described in FIG. 5 can advantageously be used to realize network security operations. Several are described herein by way of non-limiting example. It should be noted that in each of these examples, one or more appropriate DXL message topics might be provisioned to carry appropriate messages.

In the context of threat intelligence, one important factor is designating appropriate DXL endpoints as producers of reputation data. Specifically, when acting in its role as a data aggregator, threat intelligence controller 140 is a consumer of reputations. But in many cases, it is not logical to permit just any DXL endpoint 120 to act as a producer of reputations. To illustrate just one example, when a desktop computer 120-1 encounters a new malware object, the malware object may infect the machine. In the first place, desktop computer 120-1 may not be well equipped to analyze potential malware objects and assign them useful reputations. In many cases, the primary internal reputation mechanism of a desktop computer 120-1 is asking an end user 106 to verify that he wants to execute a particular process. If execution of the process is a result of the user clicking on something, he will almost always answer "Yes," since he wants the machine to do whatever he told it to do. Furthermore, if desktop computer 120-1 has permission to act as a producer of object reputations, the malware object itself may cause desktop computer 120-1 to report a high or good reputation for the malware object. This false reputation can compound the harm the malware object may do on the network, as more and more machines become infected, thus raising the malware objects reputation, making it more likely that DXL endpoints will grant it a trusted status.

To avoid such problems, only certain machines are granted permission to act as reputation data providers. In one example, these include machines that are well-suited to analyzing network objects for reputation purposes, and may be particularly hardened against common malware attacks. This may include, for example, firewall appliance 120-3, which may run a running a minimal, verified, or hardened operating system. Firewall appliance 120-3 is well placed to assign a reputation to a network object, because that is its sole function. Thus, firewall appliances, antivirus scanners, security controllers, and other similar network devices may be granted permission to act as providers of instantaneous reputation data.

However, without a threat intelligence controller 140 operating on the network, firewall appliance 120-3 may be limited to simply making instantaneous, Boolean reputation decisions: either allow an object, or disallow the object. If that decision is not collected and aggregated, the useful information arising from that decision is lost. Thus, it is beneficial for the firewall to report its decision to threat intelligence controller 140, for example by publishing a DXL message on a topic such as OBJECT_REPUTATION_DATA.

In its turn, threat intelligence controller 140 may consume DXL messages on the topic OBJECT_REPUTATION_DATA. It may receive these messages from a plurality of devices, and consistent with the DXL philosophy, need not be concerned with the details of which device sent the message, or where it is located on the network. It is sufficient for threat intelligence controller 140 to know that the device sending the message is authenticated on DXL ESB 130, and that it has permission to publish to the topic OBJECT_REPUTATION_DATA.

Threat intelligence controller 140 may also consume other message topics that are of further interest. For example, although desktop computer 120-1 does not have permission to be a producer on the OBJECT_REPUTATION_DATA topic, it may at least be trusted to report encounters with new network objects. Thus, desktop computer 120-1 may be a producer on the topic NEW_OBJECT_ENCOUNTER. When encountering a new object, desktop computer 120-1 may publish a message to the NEW_OBJECT_ENCOUNTER topic, including details about the encounter such as the time and context, and details about the new object itself as far as they are known.

In one case, a flood of reports on NEW_OBJECT_ENCOUNTER in a short time span may tip off threat intelligence controller 140 that the new object is suspect, even though some or all of the reporting endpoints did not have permission to assign and report a reputation for the object.

In another example, permission to act as a producer on a topic, and particularly a security topic, need not be a Boolean value. For example, some devices may be "more trusted" or "less trusted" than other devices. All devices with a trust level above a specified threshold may be permitted to act as producers to the OBJECT_REPUTATION_DATA topic. But not all reports will necessarily be weighted the same. Reports from more trusted devices may be weighted more heavily than reports from less trusted devices. Furthermore, in some cases, a particular device may be treated as the "most authoritative" source for certain reputations. Thus, incoming reports from other devices may be weighted and aggregated to assign a composite reputation to the object, but if and when the authoritative device reports a reputation for the object, all reports from other devices may be discarded and the authoritative reputation may be adopted as the composite reputation.

When threat intelligence controller 140 receives a DXL request message on the topic OBJECT_REPUTATION_REQUEST, it may switch from the role of a consumer to a producer. Responsive to the request, threat intelligence controller 140 may publish a message on OBJECT_REPUTATION_RESPONSE with the object's reputation. In that case, the response may go to all DXL endpoints 120 that have subscribed to the topic OBJECT_REPUTATION_RESPONSE. The message may carry an expiry to ensure that DXL endpoints 120 are not using expired data. Alternatively, threat intelligence controller 140 may publish the message on the private topic for the requesting device, so that the response goes only to that device.

Figure 6:
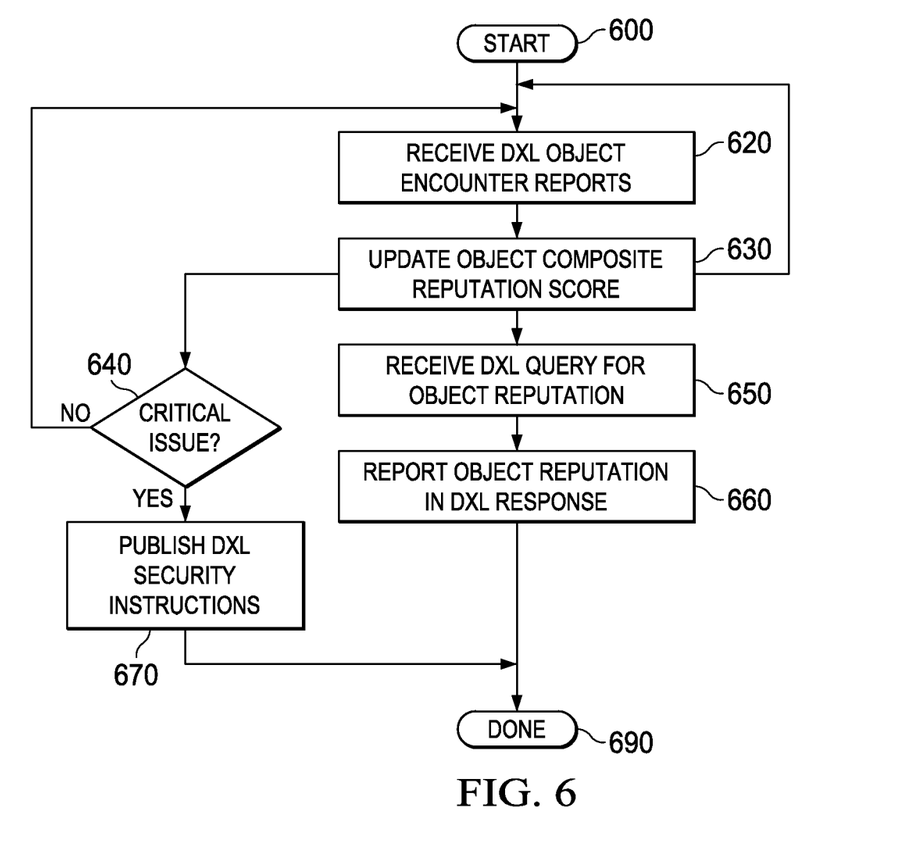
FIG. 6 is a flow chart of a method according to one or more examples of the present Specification.

FIG. 6 is a flow chart of a method 600 performed by a threat intelligence engine 426 of threat intelligence controller 140 according to one or more examples of the present Specification. Starting at block 600, in block 620, threat intelligence controller 140 receives one or more DXL object encounter reports for one or more network objects. As discussed above, these reports may be provided by authorized providers as DXL messages.

In block 630, threat intelligence engine 426 updates a composite reputation score for any object that is a subject of a reputation report from block 620. In one case, there is a an iterative loop between blocks 620 and 630, wherein the reputation of each network objects encountered is iteratively and continuously updated as new reputation reports coming in from additional authorized instantaneous reputation providers.

In another example, threat intelligence engine 426 may determine in decision block 640 whether a critical issue with a particular object has been encountered. A critical issue may be, for example, a security alert, in our report, a designation of an object as malware with a high confidence level, a security breach, or some other important security event. In that case, it may be desirable to take immediate action on network 170. Thus, if there is a critical issue in block 640, then in block 670, threat intelligence controller 140 may publish security instructions over DXL ESB 130. The security instructions may be broadcast to all devices, or to a plurality of devices within a certain class. This allows those devices to act accordingly. After publishing security instructions in block 670, in block 690 the method is done.

Returning to block 630, after a composite reputation score for a network object is updated, threat intelligence controller 140 may receive in block 650 a DXL Corey for an object a reputation. This query may originate from some other DXL endpoint 120 that has encountered the object.

In block 660, threat intelligence controller 140 reports the object reputation in a DXL response. This DXL response may take the form of a response published to the private topic of the DXL endpoint that requested the object certification. In another example, the reputation it may be published to a topic of more general interest, so that other DXL endpoints encountering the object within a certain timeframe may treat the object accordingly without sending a new request to threat intelligence controller 140.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

Example Implementations

There is disclosed in an example 1, a threat intelligence apparatus adapted for use on a data exchange layer (DXL), comprising: a network interface; a DXL client engine operable for communicatively coupling the apparatus to a DXL enterprise security bus (ESB); and one or more logic elements comprising a threat intelligence engine operable for: aggregating reputation data for a network object via a plurality of DXL messages; computing a composite reputation for the network object; receiving from a DXL endpoint a DXL request message for a reputation for the object; and providing the composite reputation via a DXL message.

There is disclosed in an example 2, the apparatus of example 1, wherein the DXL message for providing the composite reputation is a DXL response message directed to a private topic of the DXL endpoint.

There is disclosed in an example 3, the apparatus of example 1, wherein the DXL message for providing the composite reputation is a DXL message with an object reputation topic.

There is disclosed in an example 4, the apparatus of example 3, wherein the DXL message for providing the composite reputation comprises an expiry.

There is disclosed in an example 5, the apparatus of any of examples 1-4, wherein aggregating reputation data for a network object via a plurality of DXL messages comprises: determining permissions for a source of a DXL message; determining that the source has permission to act as a provider of object reputation data; and permitting reputation data from the source to be included in the aggregating.

There is disclosed in an example 6, the apparatus of any of examples 1-4, wherein aggregating reputation data for a network object via a plurality of DXL messages comprises: determining permissions for a source of a DXL message; determining that the source does not have permission to act as a provider of object reputation data; and blocking reputation data from the source from being included in the aggregating.

There is disclosed in an example 7, the apparatus of any of examples 1-4, wherein aggregating reputation data for a network object via a plurality of DXL messages comprises: determining a weighted permission for a source of a DXL message; determining that the weighted permission is sufficient for the source to act as a provider of object reputation data; and permitting reputation data from the source to be included in the aggregating, comprising weighting data provided by the source according to the weighted permission.

There is disclosed in an example 8, the apparatus of any of examples 1-4, wherein aggregating reputation data for a network object via a plurality of DXL messages comprises: receiving a plurality of determinations that the object is suspect but has not been blocked; and assigning the composite reputation a score configured to block the object on the network or subject the object to additional scrutiny or deep analysis.

There is disclosed in an example 9, the apparatus of any of examples 1-4, wherein aggregating reputation data for a network object via a plurality of DXL messages comprises: receiving a DXL message indicating that the network object has been blocked by a DXL endpoint; and publishing a DXL message indicating that the network object should be blocked by all DXL endpoints on the network.

There is disclosed in an example 10, the apparatus of any of examples 1-4, wherein aggregating reputation data for a network object via a plurality of DXL messages comprises: receiving a DXL message indicating that the network object has been blocked by a DXL endpoint; and publishing a DXL message indicating that the network object should be blocked by a class of DXL endpoints on the network.

There is disclosed in an example 11, the apparatus of any of examples 1-4, wherein aggregating reputation data for a network object via a plurality of DXL messages comprises: determining that the network object is a new object on the network, and that the new object has been encountered multiple times in a short span; and assigning the composite reputation a suspicious score.

There is disclosed in an example 12, the apparatus of any of examples 1-4, further comprising a reputation store.

There is disclosed in an example 13, the apparatus of example 12, wherein the reputation store is a self-replicating NoSQL database.

There is disclosed in an example 14, one or more computer-readable mediums having stored thereon executable instructions for providing a threat intelligence engine operable for: subscribing to a data exchange layer (DXL) object reputation topic; aggregating reputation data for a network object via a plurality of object reputation DXL messages; computing a composite reputation for the network object; receiving from a DXL endpoint a DXL request message for a reputation for the object; and providing the composite reputation via a DXL message.

There is disclosed in an example 15, the one or more computer-readable mediums of example 14, wherein the DXL message for providing the composite reputation is a DXL response message directed to a private topic of the DXL endpoint.

There is disclosed in an example 16, the one or more computer-readable mediums of example 14, wherein the DXL message for providing the composite reputation is a DXL message with an object reputation topic.

There is disclosed in an example 17, the one or more computer-readable mediums of any of examples 14-16, wherein aggregating reputation data for a network object via a plurality of DXL messages comprises: determining permissions for a source of a DXL message; determining that the source has permission to act as a provider of object reputation data; and permitting reputation data from the source to be included in the aggregating.

There is disclosed in an example 18, the one or more computer-readable mediums of any of any of examples 14-16, wherein aggregating reputation data for a network object via a plurality of DXL messages comprises: determining a weighted permission for a source of a DXL message; determining that the weighted permission is sufficient for the source to act as a provider of object reputation data; and permitting reputation data from the source to be included in the aggregating, comprising weighting data provided by the source according to the weighted permission.

There is disclosed in an example 19, the one or more computer-readable mediums of any of any of examples 14-16, wherein aggregating reputation data for a network object via a plurality of DXL messages comprises: receiving a plurality of determinations that the object is suspect but has not been blocked; and assigning the composite reputation a score configured to block the object on the network or subject the object to additional scrutiny or deep analysis.

There is disclosed in an example 20, the one or more computer-readable mediums of any of any of examples 14-16, wherein aggregating reputation data for a network object via a plurality of DXL messages comprises: receiving a DXL message indicating that the network object has been blocked by a DXL endpoint; and publishing a DXL message indicating that the network object should be blocked by all DXL endpoints on the network.

There is disclosed in an example 21, the one or more computer-readable mediums of any of any of examples 14-16, wherein aggregating reputation data for a network object via a plurality of DXL messages comprises: determining that the network object is a new object on the network, and that the new object has been encountered multiple times in a short span; and assigning the composite reputation a suspicious score.

There is disclosed in an example 22, the one or more computer-readable mediums of any of any of examples 14-16, further comprising a reputation store.

There is disclosed in an example 23, the one or more computer-readable mediums of example 22, wherein the reputation store is a self-replicating NoSQL database.

There is disclosed in an example 24, a method of providing a server engine, comprising: subscribing to a data exchange layer (DXL) object reputation topic; aggregating reputation data for a network object via a plurality of object reputation DXL messages; computing a composite reputation for the network object; receiving from a DXL endpoint a DXL request message for a reputation for the object; and providing the composite reputation via a DXL message.

There is disclosed in an example 25, the method of example 24, further comprising: determining permissions for a source of a DXL message; determining that the source has permission to act as a provider of object reputation data; and permitting reputation data from the source to be included in the aggregating.

There is disclosed in an example 26, a method comprising performing the instructions disclosed in any of examples 14-23.

There is disclosed in example 27, an apparatus comprising means for performing the method of example 26.

There is disclosed in example 28, the apparatus of example 27, wherein the apparatus comprises a processor and memory.

There is disclosed in example 29, the apparatus of example 28, wherein the apparatus further comprises a computer-readable medium having stored thereon software instructions for performing the method of example 26.

What is claimed is:

1. A computing apparatus, comprising:
   a network interface to receive a message from an enterprise service bus, the message having a topic for an object, the topic associated with a first trust level; and
   a hardware processor to at least:
      access a notification of a subscription to the topic, the notification received from an endpoint;
      publish an indication that the computing apparatus is subscribed to the topic, at least in part based on the notification, the computing apparatus having a second trust level greater than the first trust level;
      determine that the endpoint is subscribed to the topic, at least in part based on the subscription;
      distribute the message to the endpoint based on the second trust level being greater than the first trust level;
      when the second trust level satisfies a trust threshold, update a composite reputation score for the object, at least in part based on the message;
      perform a determination that an issue with the object has been encountered; and
      publish a security instruction over the enterprise service bus to the endpoint, at least in part based on the determination.

2. The computing apparatus of claim 1, wherein the issue includes at least one of a security event, a security alert, a designation of the object as malware, or a security breach.

3. The computing apparatus of claim 1, wherein the hardware processor is to subscribe to a private topic for the endpoint.

4. The computing apparatus of claim 1, wherein the security instruction represents an instruction to block the object, the security instruction being broadcast to a plurality of devices.

5. The computing apparatus of claim 1, wherein the message is a first message, wherein the network interface is to:
   receive a second message having a request topic for a reputation of the object; and
   provide the composite reputation score via a third message having a response topic for the reputation of the object.

6. The computing apparatus of claim 1, wherein the security instruction includes an expiration.

7. A non-transitory, computer-readable medium having stored thereon instructions that, when executed, cause a computing apparatus to at least:
   access a message from an enterprise service bus, the message having a topic for an object, the topic associated with a first trust level;
   access a notification of a subscription to the topic from an endpoint;
   publish that the computing apparatus is subscribed to the topic, at least in part based on the notification, the computing apparatus having a second trust level greater than the first trust level;
   determine that the endpoint is subscribed to the topic, at least in part based on the subscription;
   distribute the message to the endpoint based on the second trust level being greater than the first trust level;
   when the second trust level satisfies a trust threshold, update a composite reputation score for the object, at least in part based on the message;

perform a determination that an issue with the object has been encountered; and publish a security instruction over the enterprise service bus to the endpoint, at least in part based on the determination.

8. The computer-readable medium of claim 7, wherein the issue is a at least one of a security event, a security alert, a designation of the object as malware, or a security breach.

9. The computer-readable medium of claim 7, wherein the instructions, when executed, cause the computing apparatus to subscribe to a private topic for the endpoint.

10. The computer-readable medium of claim 7, wherein the security instruction represents a second instruction to block the object, the security instruction being broadcast to a plurality of devices.

11. The computer-readable medium of claim 7, wherein the message is a first message, wherein the instructions, when executed, cause the computing apparatus to:

access a second message having a request topic for a reputation of the object; and provide the composite reputation score via a third message having a response topic for the reputation of the object.

12. The computer-readable medium of claim 7, wherein the security instruction includes an expiration.

13. A method implemented by a computing apparatus, the method comprising:

receiving a message from an enterprise service bus, the message having a topic for an object, the topic associated with a first trust level;

receiving a notification of a subscription to the topic from an endpoint;

publishing that the computing apparatus is subscribed to the topic, at least in part based on the notification, the computing apparatus having a second trust level greater than the first trust level;

determining that the endpoint is subscribed to the topic, at least in part based on the subscription;

distributing the message to the endpoint based on the second trust level being greater than the first trust level;

when the second trust level satisfies a trust threshold, updating a composite reputation score for the object, at least in part based on the message;

determining that an issue with the object has been encountered; and publishing a security instruction over the enterprise service bus to the endpoint, at least in part based on the determination.

14. The method of claim 13, wherein the issue is at least one of a security event, a security alert, a designation of the object as malware, or a security breach.

15. The method of claim 13, further including subscribing to a private topic for the endpoint.

16. The method of claim 13, wherein the security instruction represents an instruction to block the object, the security instruction being broadcast to a plurality of devices.

17. The method of claim 13, wherein the message is a first message, further including:

receiving a second message having a request topic for a reputation of the object; and providing the composite reputation score via a third message having a response topic for the reputation of the object.

* * * * *